United States Patent
Lin et al.

(10) Patent No.: US 10,444,467 B2
(45) Date of Patent: Oct. 15, 2019

(54) COLLIMATION LENS MODULE AND LIGHT SOURCE MODULE USING THE SAME

(71) Applicant: HIMAX TECHNOLOGIES LIMITED, Tainan (TW)

(72) Inventors: Han-Ching Lin, Tainan (TW); Yin-Dong Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 134 days.

(21) Appl. No.: 14/952,869

(22) Filed: Nov. 25, 2015

(65) Prior Publication Data

US 2017/0146215 A1 May 25, 2017

(51) Int. Cl.
*G02B 9/12* (2006.01)
*G02B 9/00* (2006.01)
*G02B 19/00* (2006.01)
*G02B 13/00* (2006.01)

(52) U.S. Cl.
CPC .......... *G02B 9/12* (2013.01); *G02B 19/0014* (2013.01); *G02B 19/0061* (2013.01); *G02B 13/0085* (2013.01)

(58) Field of Classification Search
CPC .................................. G02B 9/12; G02B 27/30
See application file for complete search history.

(56) References Cited

U.S. PATENT DOCUMENTS

| 5,386,312 A | 1/1995 | Spencer |
| 6,014,262 A | 1/2000 | Noda |
| 6,104,541 A | 8/2000 | Otomo |
| 6,396,640 B2 | 5/2002 | Otomo |
| 8,125,720 B2* | 2/2012 | Chang ...................... G02B 9/04 359/708 |
| 2005/0105189 A1* | 5/2005 | Mikhailov ........... G02B 6/4204 359/641 |
| 2007/0036537 A1* | 2/2007 | You ...................... G02B 13/003 396/333 |
| 2010/0328743 A1* | 12/2010 | Wolterink .......... B29D 11/0073 359/19 |

(Continued)

FOREIGN PATENT DOCUMENTS

| CN | 204269932 U | 4/2015 |
| EP | 0312341 A2 | 4/1989 |
| JP | S60-170826 A | 9/1985 |

(Continued)

*Primary Examiner* — Sharon E Payne
(74) *Attorney, Agent, or Firm* — CKC & Partners Co., LLC

(57) ABSTRACT

A collimating lens module and a light source module using the same are provided. The collimating lens module includes a first lens, a second lens, a third lens, a fourth lens and a fifth lens. The first lens is configured for receiving light, wherein the first lens is a negative aspheric lens. The second lens is disposed on the first lens, wherein the second lens is a positive lens. The third lens is disposed on the second lens, wherein the third lens is a negative lens. The fourth lens is disposed on the third lens, wherein the fourth lens is a positive lens. The fifth lens is disposed on the fourth lens, wherein the fifth lens is a positive aspheric lens and configured for outputting collimated light. The light source module includes the collimating lens module and a light emitting diode (LED).

20 Claims, 5 Drawing Sheets

(56) References Cited

U.S. PATENT DOCUMENTS

2014/0049610 A1  2/2014  Hudman et al.

FOREIGN PATENT DOCUMENTS

| JP | 2000-101516 A | 4/2000 |
| JP | 2013-29974 A | 2/2013 |
| JP | 2015-169826 A | 9/2015 |
| KR | 2006-0129449 A | 12/2006 |
| KR | 2010-0014801 A | 2/2010 |
| WO | 2009/101971 A1 | 8/2009 |
| WO | 2014/209471 A2 | 12/2014 |

* cited by examiner

COLLIMATION LENS MODULE AND LIGHT SOURCE MODULE USING THE SAME

BACKGROUND

Field of Disclosure

The invention relates to a collimation module and a light source module using the same, and more particularly, to a wafer-level collimation module and a light source module using the same.

Description of Related Art

A collimation light source is a popular device used in various electronic devices, such as projectors, liquid crystal displays and laser pointers. A conventional collimation light source may include a light emitting diode (LED) and a collimation lens module. The collimation lens module is used to collimate light lights emitted by the LED to provide collimated light.

However, fabrication cost of the collimation lens is high, and the operation of assembling the lens of the collimation lens module is difficult.

SUMMARY

An aspect of the present invention is to provide a collimation lens module and a light source module using the same. The collimation lens module includes wafer-level lenses having flat surfaces, thereby enabling easy assembling and mass production.

In accordance with an embodiment of the present invention, the collimation lens module includes a first lens, a second lens, a third lens, a fourth lens and a fifth lens. The first lens is configured for receiving light, wherein the first lens is a negative aspheric lens. The second lens is disposed on the first lens, wherein the second lens is a positive lens. The third lens is disposed on the second lens, wherein the third lens is a negative lens. The fourth lens is disposed on the third lens, wherein the fourth lens is a positive lens. The fifth lens is disposed on the fourth lens, wherein the fifth lens is a positive aspheric lens and configured for outputting the collimated light.

In accordance with another embodiment of the present invention, the light source module includes a light emitting diode (LED) and a collimating lens module. The LED is configured for emitting light. The collimating lens module is configured to collimate the light and output collimated light. The collimating lens module includes a first lens, a second lens, a third lens, a fourth lens and a fifth lens. The first lens is configured for receiving light, wherein the first lens is a negative aspheric lens. The second lens is disposed on the first lens, wherein the second lens is a positive lens. The third lens is disposed on the second lens, wherein the third lens is a negative lens. The fourth lens is disposed on the third lens, wherein the fourth lens is a positive lens. The fifth lens is disposed on the fourth lens, wherein the fifth lens is a positive aspheric lens and configured for outputting the collimated light.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, the disclosure will be explained with reference to embodiments thereof. However, these embodiments are not intended to limit the disclosure to any specific environment, applications or particular implementations described in these embodiments. Therefore, the description of these embodiments is only for the purpose of illustration rather than to limit the disclosure. In the following embodiments and attached drawings, elements not directly related to the disclosure are omitted from depiction; and the dimensional relationships among individual elements in the attached drawings are illustrated only for ease of understanding, but not to limit the actual scale.

It will be understood that, although the terms "first" and "second" may be used herein to describe various elements, components, regions, layers and/or sections, these elements, components, regions, layers and/or sections should not be limited by these terms. These terms are only used to distinguish one element, component, region, layer or section from another.

Figure 1:
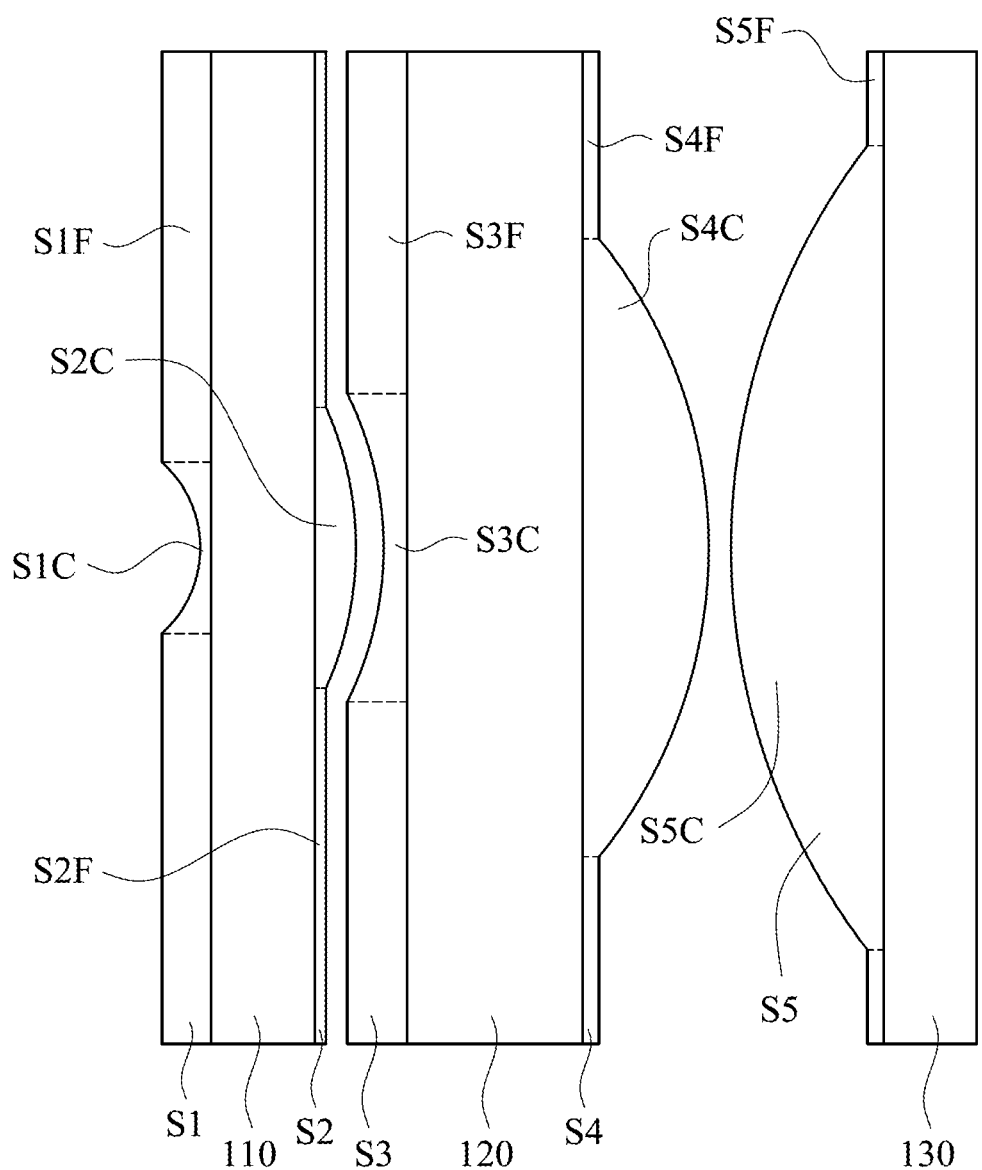
FIG. 1 is a schematic diagram showing a cross-sectional view of a collimation lens module in accordance with an embodiment of the present invention.

FIG. 1 is a schematic diagram showing a cross-sectional view of a collimation lens module 100 in accordance with an embodiment of the present invention. The collimation lens module 100 includes a first substrate 110, a second substrate 120, a third substrate 130, a first lens S1, a second lens S2, a third lens S3, a fourth lens S4, a fifth lens S5 disposed thereon. The first lens S1 receives light to be collimated, and the fifth lens S5 outputs collimated light. In this embodiment, the first lens S1, the second lens S2, the third lens S3, the fourth lens S4 and the fifth lens S5 are wafer-level lenses, but embodiments of the present invention are not limited thereto.

The first substrate 110, the second substrate 120 and the third substrate 130 have a refractive index substantially smaller than 1.6 and greater than 1.5 and have an Abbe number substantially smaller than 65 and greater than 45. The first substrate 110, the second substrate 120 and the third substrate 130 are formed by glass in this embodiment, but embodiments of the present invention are not limited thereto. In some embodiments, the first substrate 110, the second substrate 120 and the third substrate 130 are formed from plastic material such as acrylic resin and polycarbonate resin.

The first lens S1 and the second lens S2 are disposed on opposite surfaces of the first substrate 110. The first lens S1 is configured to receive light to be collimated. The first lens S1 is a negative aspheric lens having a curved portion S1C and a flat portion S1F. The second lens S2 is a positive lens having a curved portion S2C and a flat portion S2F. Specifically, the first lens S1 is a plano-concave lens, and the second lens S2 is a plano-convex lens, and a surface area occupied by the curved portion S1C is smaller that of the curved portion S2C.

The third lens S3 and the fourth lens S4 are disposed on opposite surfaces of the second substrate 120, and the third lens S3 is opposite to the second lens S2. The third lens S3 is a negative aspheric lens having a curved portion S3C and a flat portion S3F. The fourth lens S4 is a positive lens having a curved portion S4C and a flat portion S4F. Specifically, the third lens S3 is a plano-concave lens, and the fourth lens S4 is a plano-convex lens, and the surface area occupied by the curved portion S2C is smaller that of the curved portion S3C, and the surface area occupied by the curved portion S3C is smaller that of the curved portion S4C.

The fifth lens S5 is disposed on the third substrate 130 and opposite to the fourth lens S4. The fifth lens S5 is a positive lens having a curved portion S5C and a flat portion S5F. Specifically, the fifth lens S5 is a plano-convex lens, and the surface area occupied by the curved portion S4C is smaller that of the curved portion S5C.

In this embodiment, at least the first lens S1 and the fifth lens S5 are aspheric lenses. However, embodiments of the present invention are not limited thereto. In some embodiments of the present invention, the first lens S1, the second lens S2, the third lens S3, the fourth lens S4, and the fifth lens S5 are aspheric lenses.

Figure 2A:
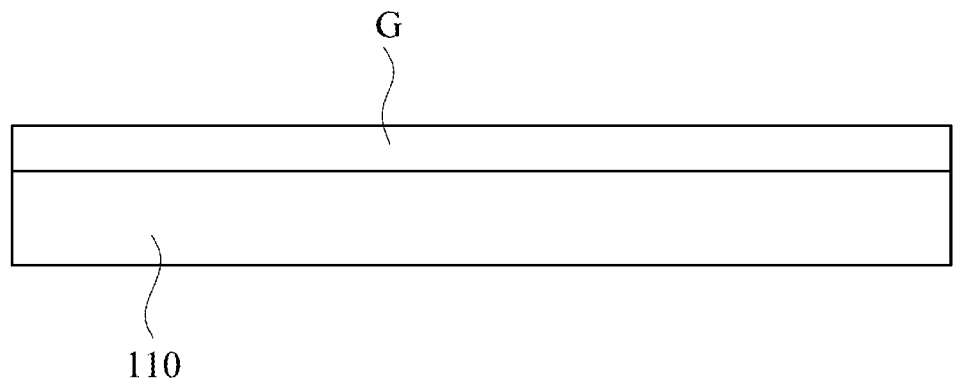
FIG. 2a to FIG. 2d are schematic cross-sectional views of intermediate stages showing a method for fabricating the lenses.
Figure 2B:
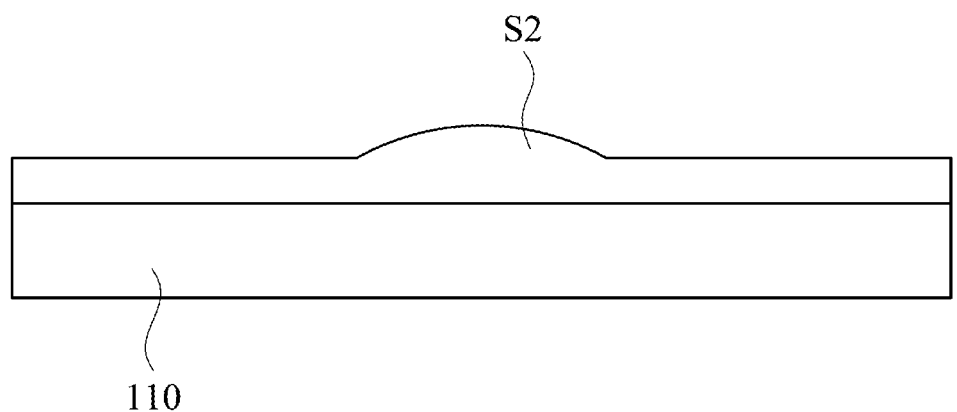
Figure 2C:
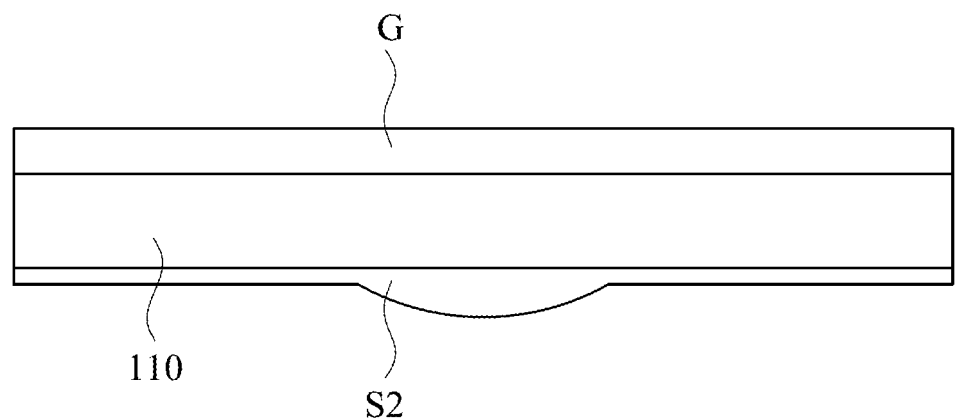
Figure 2D:
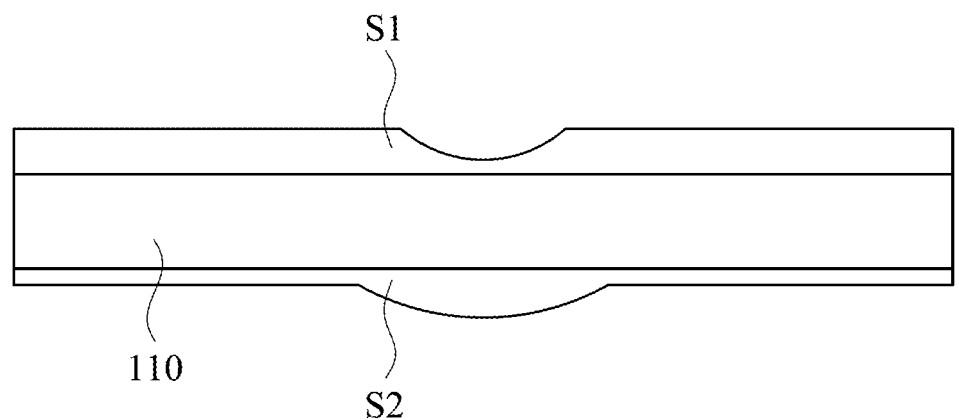

FIG. 2a to FIG. 2d are schematic cross-sectional views of intermediate stages showing a method for fabricating the first lens S1 and the second lens S2, in which the first lens S1 and the second lens S2 are fabricated in wafer level. At first, the first substrate 110 provided with a glue material G coated as shown in FIG. 2a. Then, a press-molding process is conducted to form the second lens S2, as shown in FIG. 2b. Thereafter, a surface of the first substrate 110 opposite to the second lens S2 is coated with the glue material G as shown in FIG. 2c. Then, another press-molding process is conducted to form the first lens S1 as shown in FIG. 2d.

The method for fabricating the third lens S3, the fourth lens S4 and the fifth lens S5 are similar to that of the first lens S1 and the second lens S2, and thus details of the method for fabricating the third lens S3, the fourth lens S4 and the fifth lens S5 are not repeated.

Since the collimation lens module 100 can be fabricated in wafer level, the size of the collimation lens is decreased, and assembling of the collimation lens module 100 can be easier than that of a conventional lens module.

Figure 3:
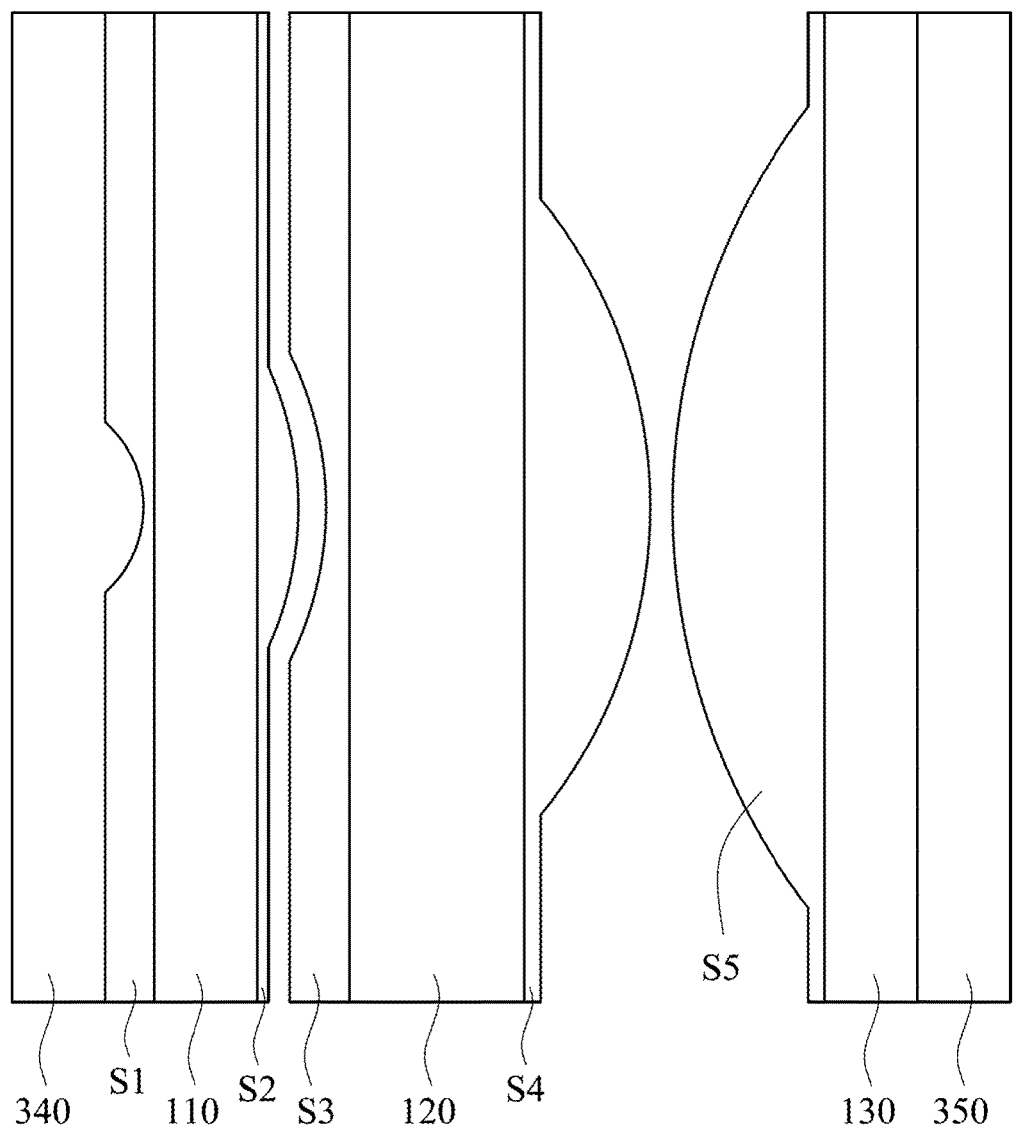
FIG. 3 is a schematic diagram showing a cross-sectional view of a collimation lens module in accordance with an embodiment of the present invention.

Referring to FIG. 3, FIG. 3 is a schematic diagram showing a cross-sectional view of a collimation lens module 300 in accordance with an embodiment of the present invention. The collimation lens module 300 is similar to the collimation lens module 100, but the difference is in that the collimation lens module 300 further includes a window substrate 340 and a cover substrate 350. The window substrate 340 is disposed on the first lens S1 to protect the first lens S1 and used as a widow to receive light, and the cover substrate 350 is disposed on the substrate 130 to protect the substrate 130.

Figure 4:
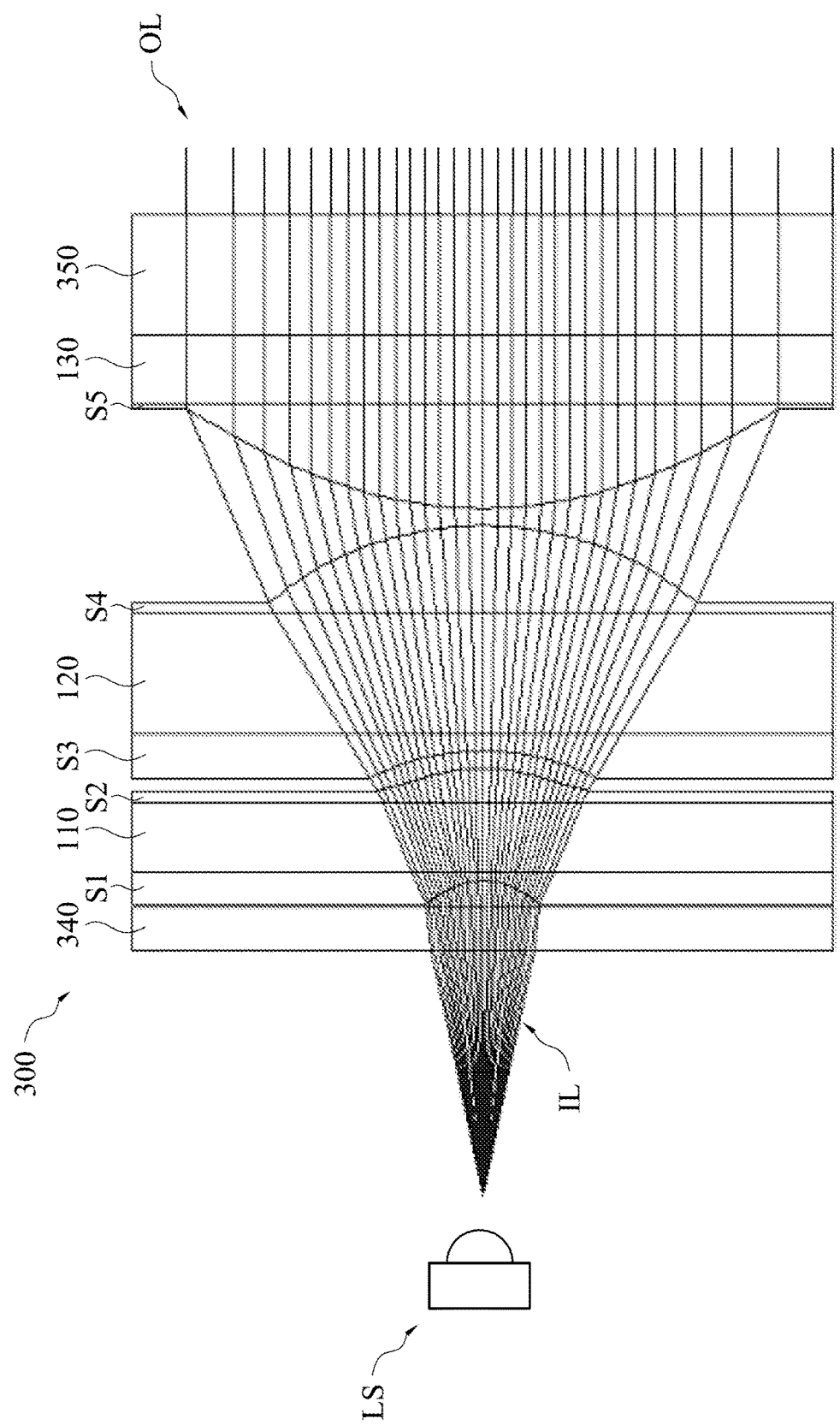
FIG. 4 is a schematic diagram showing a cross-sectional view of a light source module 400 in accordance with an embodiment of the present invention.

Referring to FIG. 4, FIG. 4 is a schematic diagram showing a cross-sectional view of a light source module 400 in accordance with an embodiment of the present invention. The light source module 400 includes the collimation lens module 300 and a light emitting diode (LED) LS. The LED LS is configured to emit light IL to the window substrate 340 of the collimation lens module 300. The light IL is collimated by the first lens S1, the second lens S2, the third lens S3, the fourth lens S4 and the fifth lens S5, and then the collimated light OL is outputted from the cover substrate 350.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A collimating lens module adapted for collimating light and outputting collimated light, the collimating lens module comprising:
    a first lens configured for receiving the light, wherein the first lens is a negative aspheric lens;
    a second lens disposed on the first lens, wherein the second lens is a positive lens;
    a third lens disposed on the second lens, wherein the third lens is a negative lens;
    a fourth lens disposed on the third lens, wherein the fourth lens is a positive lens; and
    a fifth lens disposed on the fourth lens, wherein the fifth lens is a positive aspheric lens and configured for outputting the collimated light;
    wherein the fourth lens and the fifth lens are plano-convex lenses, and a convex portion of the fourth lens is opposite to a convex portion of the fifth lens, and the first lens and the third lenses are plano-concave lenses, and a concave portion of the first lens does not face the second lens, the third lens, the fourth lens and the fifth lens.

2. The collimating lens module of claim 1, wherein the second lens, the third lens and the fourth lens are aspheric lenses.

3. The collimating lens module of claim 1, wherein the second lens is a plano-convex lens.

4. The collimating lens module of claim 1, further comprises:
    a first substrate, wherein the first lens and the second lens are formed on opposite surfaces of the first substrate;
    a second substrate, wherein the third lens and the fourth lens are formed on opposite surfaces of the second substrate, and the third lens is opposite to the second lens; and
    a third substrate, wherein the fifth lens is formed on the third substrate and opposite to the fourth lens.

5. The collimating lens module of claim 4, wherein the first substrate, the second substrate and the third substrate are glass substrates.

6. The collimating lens module of claim 5, wherein each of a refractive index of the first substrate, a refractive index of the second substrate and a refractive index of the third substrate is substantially smaller than 1.6 and greater than 1.5.

7. The collimating lens module of claim 5, wherein each of an Abbe number of the first substrate, an Abbe number of the second substrate and an Abbe number of the third substrate is substantially smaller than 65 and greater than 45.

8. The collimating lens module of claim 1, wherein the first lens, the second lens, the third lens, the fourth lens and the fifth lens are wafer-level lenses.

9. A light source module adapted for providing collimated light, the light source module comprising:
    a light emitting diode (LED) configured for emitting light;
    a collimating lens module configured to collimate the light and output collimated light, wherein the collimating lens module comprises:
        a first lens configured for receiving the light, wherein the first lens is a negative aspheric lens;
        a second lens disposed on the first lens, wherein the second lens is a positive lens;
        a third lens disposed on the second lens, wherein the third lens is a negative lens;

a fourth lens disposed on the third lens, wherein the fourth lens is a positive lens; and a fifth lens disposed on the fourth lens, wherein the fifth lens is a positive aspheric lens and configured for outputting the collimated light;

wherein the fourth lens and the fifth lens are plano-convex lenses, and a convex portion of the fourth lens is opposite to a convex portion of the fifth lens, and the first lens and the third lenses are plano-concave lenses, and a concave portion of the first lens does not face the second lens, the third lens, the fourth lens and the fifth lens.

10. The light source module of claim 9, wherein the second lens, the third lens and the fourth lens are aspheric lenses.

11. The light source module of claim 9, wherein the second lens is a plano-convex lens.

12. The light source module of claim 9, further comprises:
a first substrate, wherein the first lens and the second lens are formed on opposite surfaces of the first substrate;
a second substrate, wherein the third lens and the fourth lens are formed on opposite surfaces of the second substrate, and the third lens is opposite to the second lens; and
a third substrate, wherein the fifth lens is formed on the third substrate and opposite to the fourth lens.

13. The light source module of claim 12, wherein the first substrate, the second substrate and the third substrate are glass substrates.

14. The light source module of claim 13, wherein each of a refractive index of the first substrate, a refractive index of the second substrate and a refractive index of the third substrate is substantially smaller than 1.6 and greater than 1.5.

15. The light source module of claim 13, wherein each of an Abbe number of the first substrate, an Abbe number of the second substrate and an Abbe number of the third substrate is substantially smaller than 65 and greater than 45.

16. The light source module of claim 9, wherein the first lens, the second lens, the third lens, the fourth lens and the fifth lens are wafer-level lenses.

17. The light source module of claim 9, wherein:
the first lens is a plano-concave lens having a concave curved portion, the second lens is a plano-convex lens having a convex curved portion, the third lens is a plano-concave lens having a concave curved portion, the fourth lens is a plano-convex lens having a convex curved portion, and the fifth lens is a plano-convex lens having a convex curved portion;
a surface area occupied by the concave curved portion of the first lens is smaller than a surface area occupied by the convex curved portion of the second lens;
the surface area occupied by the convex curved portion of the second lens is smaller than a surface area occupied by the concave curved portion of the third lens;
the surface area occupied by the concave curved portion of the third lens is smaller than a surface area occupied by the convex curved portion of the fourth lens; and
the surface area occupied by the convex curved portion of the fourth lens is smaller than a surface area occupied by the convex curved portion of the fifth lens.

18. The light source module of claim 17, wherein the first lens has a planar rear surface, and the concave curved portion of the first lens is opposite to the planar rear surface thereof; the fourth lens has a planar rear surface, and the convex curved portion of the fourth lens is opposite to the planar rear surface thereof; and the fifth lens has a planar rear surface, and the convex curved portion of the fifth lens is opposite to the planar rear surface thereof;

wherein the first lens further has flat portions respectively on both sides of the concaved curved portion thereof and opposite to the planar rear surface of the first lens, and the surface area occupied by the concaved curved portion of the first lens is many times less than a combined surface area of the flat portions of the first lens;

wherein the fourth lens further has flat portions respectively on both sides of the convex curved portion thereof and opposite to the planar rear surface of the fourth lens, and the surface area occupied by the convex curved portion of the fourth lens is many times greater than a combined surface area of the flat portions of the fourth lens; and wherein the fifth lens further has flat portions respectively on both sides of the convex curved portion thereof and opposite to the planar rear surface of the fifth lens, and the surface area occupied by the convex curved portion of the fifth lens is many times greater than a combined surface area of the flat portions of the fifth lens.

19. The collimating lens module of claim 1, wherein:
the first lens is a plano-concave lens having a concave curved portion, the second lens is a plano-convex lens having a convex curved portion, the third lens is a plano-concave lens having a concave curved portion, the fourth lens is a plano-convex lens having a convex curved portion, and the fifth lens is a plano-convex lens having a convex curved portion;
a surface area occupied by the concave curved portion of the first lens is smaller than a surface area occupied by the convex curved portion of the second lens;
the surface area occupied by the convex curved portion of the second lens is smaller than a surface area occupied by the concave curved portion of the third lens;
the surface area occupied by the concave curved portion of the third lens is smaller than a surface area occupied by the convex curved portion of the fourth lens; and
the surface area occupied by the convex curved portion of the fourth lens is smaller than a surface area occupied by the convex curved portion of the fifth lens.

20. The collimating lens module of claim 19, wherein the first lens has a planar rear surface, and the concave curved portion of the first lens is opposite to the planar rear surface thereof; the fourth lens has a planar rear surface, and the convex curved portion of the fourth lens is opposite to the planar rear surface thereof; and the fifth lens has a planar rear surface, and the convex curved portion of the fifth lens is opposite to the planar rear surface thereof;

wherein the first lens further has flat portions respectively on both sides of the concaved curved portion thereof and opposite to the planar rear surface of the first lens, and the surface area occupied by the concaved curved portion of the first lens is many times less than a combined surface area of the flat portions of the first lens;

wherein the fourth lens further has flat portions respectively on both sides of the convex curved portion thereof and opposite to the planar rear surface of the fourth lens, and the surface area occupied by the convex curved portion of the fourth lens is many times greater than a combined surface area of the flat portions of the fourth lens; and wherein the fifth lens further has flat portions respectively on both sides of the convex curved portion thereof and opposite to the planar rear surface of the fifth lens, and the surface area occupied by the convex curved portion of the fifth lens is many times greater than a combined surface area of the flat portions of the fifth lens.

* * * * *